Aug. 11, 1970  H. W. BOOTHROYD  3,523,458
DAMPING MEANS FOR RATE GYROS
Filed Nov. 13, 1967  3 Sheets-Sheet 1
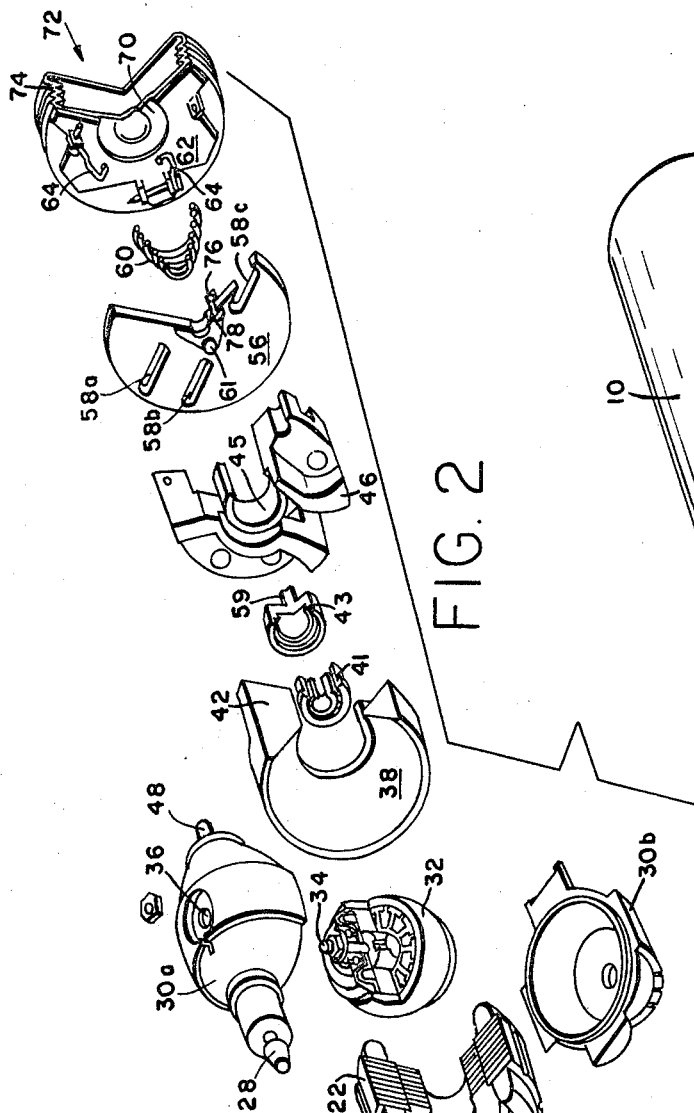
INVENTOR
HOWARD W. BOOTHROYD
BY
Richard J. Seligman
ATTORNEY

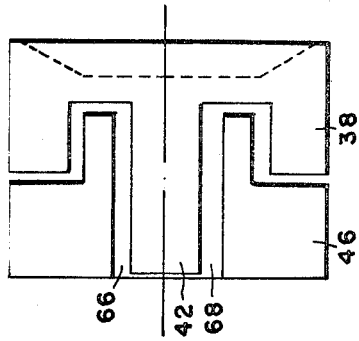
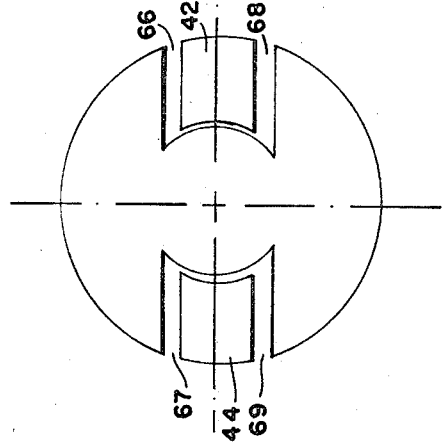
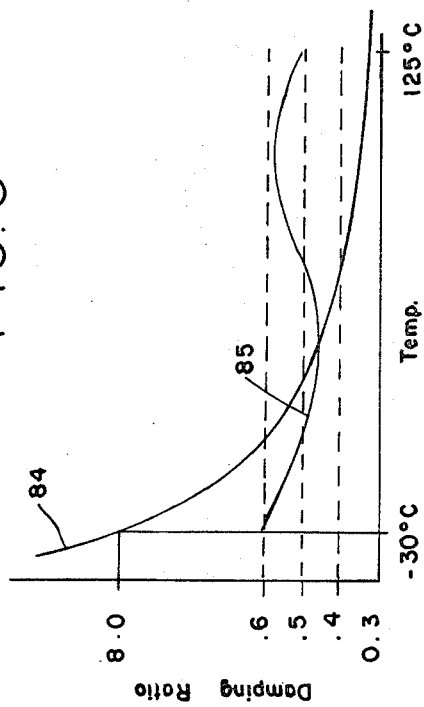
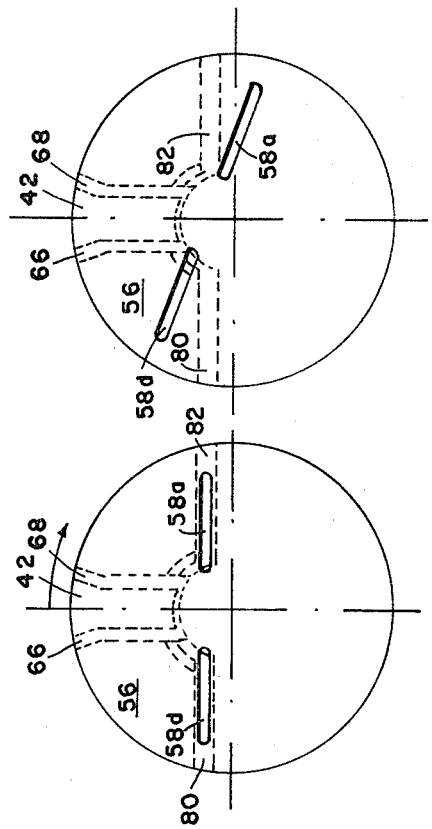
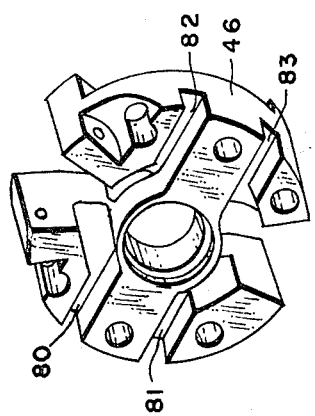

United States Patent Office 3,523,458
Patented Aug. 11, 1970

3,523,458
DAMPING MEANS FOR RATE GYROS
Howard W. Boothroyd, Amherst, N.H., assignor to Sanders Associates, Inc., Nashua, N.H., a corporation of Delaware
Filed Nov. 13, 1967, Ser. No. 682,287
Int. Cl. G01c 19/04
U.S. Cl. 74—5.5                                    10 Claims

ABSTRACT OF THE DISCLOSURE

Improved damping means for gyros and more particularly to means for providing relatively constant damping in subminiature rate gyros over a broad temperature range while minimizing gyro size. Longitudinal travel of a bellows, occasioned by change in the volume of damping fluid in the gyro which results from temperature change, is converted to rotational motion of an orifice plate which controls the area of the damping control orifice. Drive links are attached to the bellows and the orifice plate. One end of each link is attached to the bellows about the perimeter of a circle of relatively large radius, while the opposite end of each link is attached to an orifice plate about the perimeter of a circle of much smaller radius. Bellows movement changes the effective length of the drive links thereby rotating the orifice plate. Because of the difference in radius of the two circles a minimum longitudinal motion is amplified to a much greater rotational motion, and thus a smaller bellows can suffice resulting in a shorter gyro.

BACKGROUND OF THE INVENTION

In rate gyros, the gyro wheel is mounted in a gimbal system so as to have only one degree of freedom, and the spin axis is so oriented that rotation about the input axis causes the gyro to develop a torque producing rotation of the gimbal about its axis of freedom. Such rotation is opposed by resilient action, to give a quantative indication of the action to be measured.

Rotation of the gimbal about its axis of freedom is damped by fluid, more particularly liquid, and the damping liquid separates the gimbal assembly from the outer housing by a small space, thereby providing relatively high shock protection for the gyro mechanism, even with preferred low viscosity damping liquid. However, the damping of oscillatory effects produced by the natural resonant frequency of the gimbal and gimbal mounting can present a problem.

The gimbal has a dominant resonance mode which results primarily from the moment of inertia about the output axis of all gimbal gyro parts acting against the torsion bar constraint. This dominant resonance is the natural frequency of the gimbal and gimbal assembly. The motion caused by this frequency must be damped, otherwise spurious output signals will be present. Critical damping is effected when the energy stored as a result of the resonance equals that energy dissipated by the damping in each cycle of oscillation. In other words at critical damping, the damping energy is equal and opposite to the resonant energy. Perfect critical damping is seldom effected without a tendency to overdamp resulting in a lowering of the frequency response of the gyro. From experience, the most satisfactory damping occurs if there is a ratio between the actual damping and the critical damping of approximately 0.5, provided that this ratio remains constant over the temperature range of operation of the gyro. The ratio of actual damping to critical damping is known as the damping ratio. A relatively constant damping ratio is desired for precise control. The improved damping system of the present invention provides nearly the ultimate in such damping control both with respect to constance over the temperature range as well as critical damping. A damping ratio of $0.5 \pm .1$ from $-30°$ C. to $120°$ C. is possible with the improved damping system of the present invention.

It has been found that changes in temperature cause changes in damping. This is due to changes in viscosity of the liquid with temperature, which in turn affect the degree of damping obtained. Accordingly, it is desirable to provide a damping system affording constant damping within wide variations of temperature. In the past, fluid volumetric compensation has been controlled by employing bellows travel. This mechanically varied the damping through a system of chambers, paddles, pistons and orifices. Prior art use of bellows has been such that any *linear* travel of the bellows resulted in a corresponding *linear* movement of some damping control device. The present invention converts the *linear* movement of the bellows to *rotational* movement of an orifice plate which controls damping. Using this approach means that a much shorter bellows is possible. This results in a subminiature gyro of decreased length and one which is constantly damped over a wide temperature range.

SUMMARY

Rotational activation of an orifice plate as a function of temperature is accomplished by making use of the volumetric expansion and contraction of the total fluid volume within the gyro. This volume differential causes longitudinal motion of the face of a bellows assembly, the fixed end of which is attached securely to the gyro housing. The longitudinal bellows motion is transformed to rotary motion by drive links and applied to the orifice plate. Each drive link has one end attached to the face of the bellows at a large radius while the other end is attached to the orifice plate at a much smaller radius. As the bellows face moves longitudinally, the effective length of the drive links increase or decrease, depending upon the direction of motion. This effective change of length must be absorbed by rotation of the orifice plate. The attachment of the drive links at different radii produces a mechanical amplification which is necessary to rotate the orifice plate through a relatively large angle in response to a very small bellows linear motion. A second amplification is derived by having the orifices near the periphery of the orifice plate, thus a relatively large orifice area change occurs in response to a very small bellows linear motion.

Prior art problems associated with the need for a less complex, shorter and constant damped, temperature compensated, subminiature rate gyro are thus obviated by employing the inventive concept briefly summarized above.

Accordingly, among the objects of this invention are:

To provide an improved gyro damping system which is economical in space within the housing, thereby minimizing weight, space and length of the entire gyro assembly;

To provide an assembly which is relatively inexpensive to manufacture and assemble;

To provide a gyro damping assembly which affords substantially constant damping over a relatively wide range of temperatures, and which is accomplished with a decrease in the overall length of the gyro;

To provide a gyro damping system having a plurality of drive links, which in conjunction with an orifice plate, change the linear travel of a bellows to rotational motion of the orifice control plate.

BRIEF DESCRIPTION OF THE DRAWINGS

The above-mentioned and other features and objects of this invention will become more apparent by reference to the following description, taken in conjunction with the accompanying drawings, in which:

FIG. 1 is a perspective side view of a gyroscope embodying the present invention;

FIG. 2 is a perspective view of the major component parts of the gyroscope of FIG. 1 shown partly in section and in exploded form in the order of assembly to each other;

FIGS. 4A and 4B are top and front view sketches illustrating the cavities formed by the assembly of the paddle ring and damping block of FIG. 2;

FIGS. 5A and 5B are sketches illustrating the cooperation between the orifice plate and damping block of FIG. 2 to control the damping fluid orifice;

FIG. 6 is a graph showing the effectiveness of the improved damping system; and

FIG. 7 is a perspective view illustrating the back portion of the damping block of FIG. 2.

DESCRIPTION OF A PREFERRED EMBODIMENT

Figure 3:
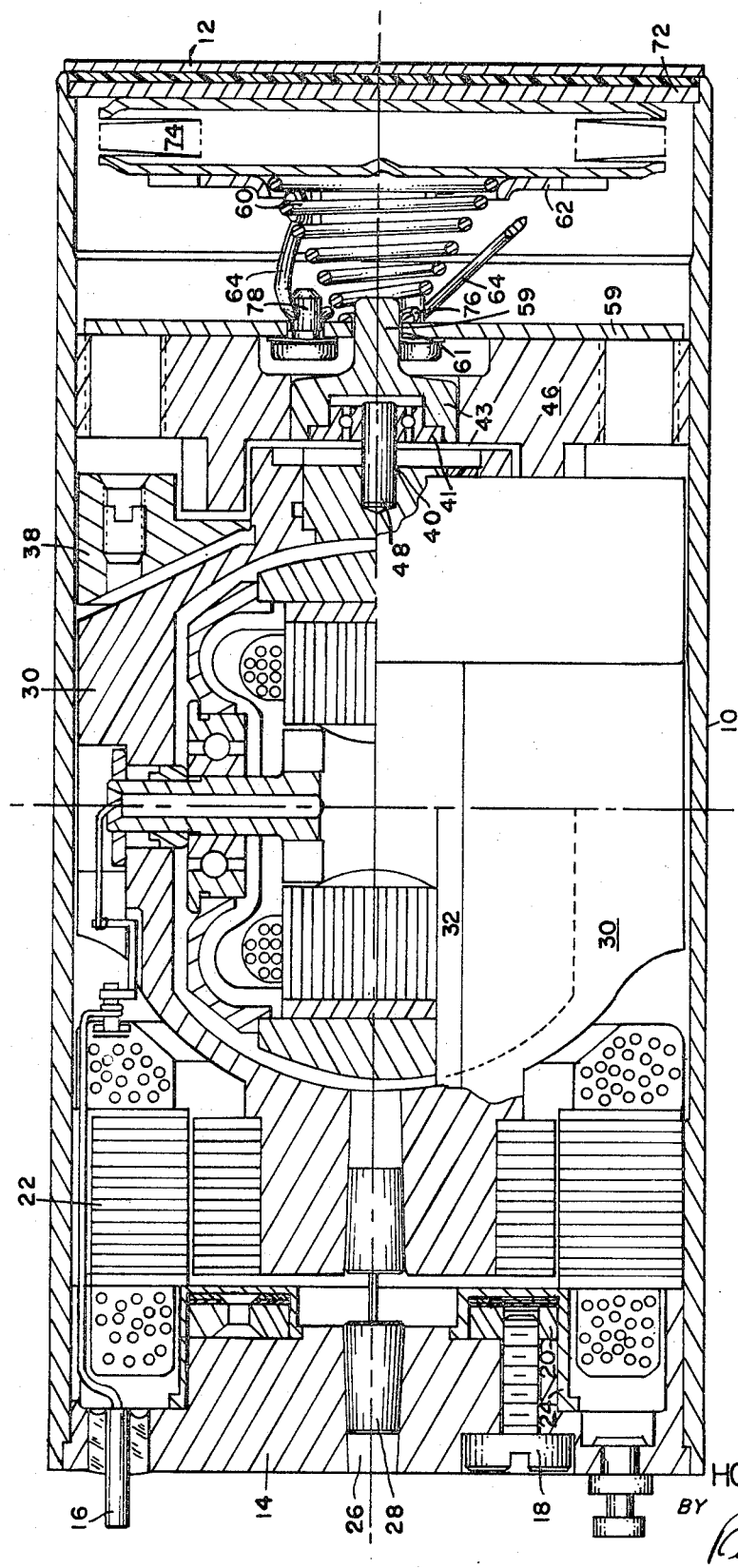
FIG. 3 is an enlarged, side elevation view, partly in section, of the rate gyroscope of FIG. 1.

With the exception of the improved damping system, which will be described in detail hereinafter, the improved subminiature rate gyro of the present invention is similar to a series of gyros which are the subject matter of issued U.S. patents, assigned to the assignee of the present application, such as Pat. Nos. 2,841,016 and 2,945,380.

Referring to FIGS. 1, 2 and 3 the improved gyro includes a housing 10 having end caps 12 and 14. The housing 10 is generally of cylindrical form and the end caps 12 and 14 are secured to the housing 10 to effect a hermetic seal in any suitable fashion. The end cap 14 includes electrical terminals 16 and null adjusting screws 18. Coupled to the adjusting screws 18 is a null adjusting ring 20 which cooperates with a pickoff 22 through a sealing piece 24 of non-magnetic material. The end cap 14 also includes a tapered hole 26 for receiving and clamping one end of a tapered torsion bar 28 mounted in one half 30a of a gimbal 30, the member 30b providing the other half of the gimbal. The gimbal 30 encloses a high-speed inside-out motor 32 having one end of its shaft 34 mounted in the aperture 36 of the frontal gimbal section 30a and the other shaft end not shown, mounted in a similar hole in the rear gimbal section 30b. The wiring for the motor 32 is connected through selected terminals 16 in the end cap 14, to a flexible lead, then through the motor shaft to the motor stator windings. To provide the gyroscopic effect, the motor 32 rotates at extremely high speeds and the gimbal 30 is free to rotate slightly under constraint on the axis through the torsion bar 28.

The frontal 30a and rear 30b sections of the gimbal 30 are soldered together, evacuated and filled with helium. The pickoff rotor is pressed onto one end of gimbal 30 and a paddle ring 38 is cemented onto the other end. The end of the gimbal 30 on which the paddle ring 38 is cemented includes a centrally located hole 40, in which a pivot pin 48 is located. Pin 48 is preferably press fitted into hole 40. The other end of pin 48 is supported in a bearing 41, which is supported by a member 43, member 43 in turn is made to fit within a bore 45 within a damping block 46. (The back side thereof being illustrated in FIG. 7.)

The paddle ring 38 is a metallic construction, comparatively lightweight and provides a minimum moment of inertia about the output axis, and includes on one surface paddles 42 and 44 diametrically opposed. Damping block 46 is made to fit within paddle ring 38 and defines a plurality of cavities 66, 67, 68 and 69 (see FIG. 4). An orifice plate 56 containing a number of orifices 58a, 58b, 58c, 58d is held against damping block 46 by a compression spring 60. A projecting portion 59 of member 43 fits into a hole 61 within orifice plate 56. The opposite end of spring 60 fits into a recess 70 on the face of a bellows assembly 72. Bellows assembly 72 includes a bellows 74, and a drive plate 62 having rotatably mounted thereon 3 drive links 64 spaced 120° apart. The bellows assembly 72 is fixed with respect to gyro housing 10 and cannot rotate with respect thereto. The L-shaped ends of the drive links 64 engage corresponding holes 76 in pins 78 in orifice plate 56. Pins 78 are rotatably mounted in the orifice plate and the drive links 64 are rotatably mounted in the pins 78.

Drive links 64 are attached to drive plate 62 about a circle of relatively large diameter. The other ends of the links 64 engage pins 78 in orfice plate 56 about a circle of much smaller diameter. Therefore, when the bellows move longitudinally the effective length of the drive links is changed and the longitudinal motion of the bellows is amplified and converted to rotary motion of the orifice plate. Before the gyro is hermetically sealed the housing 10 is completely filled with a suitable viscous fluid such as silicone oil.

The utilization of the paddle ring, damping block, orifice plate and bellows, which comprise the improved damping system, is described more fully hereinafter. The gyroscopic action of the gyro itself is accomplished as set forth in the aforementioned Pat. No. 2,945,380.

In general, the damping is effected by providing a paddle ring 38 which rotates with the movement of the gimbal 30 causing paddles 42, 44 to move the viscous fluid in cavities 66, 67, 68, 69 (see FIG. 4) formed by the mating of paddle ring 38 with damping block 46. By maintaining the reaction of the fluid on the paddles 42, 44 substantially constant, the desired damping ratio is obtainable. If the fluid maintained the same viscosity over the operating temperature range of the gyro, the damping problem would thus be simply solved by selection of a fluid of the proper viscosity. However, the fluid does not maintain constant viscosity and, therefore, continuous compensation for this change must be effected. The fluid must be controlled to produce substantially the same reaction against the paddles 42, 44 regardless of the change in viscosity and regardless of the operating temperature of the gyro. In general, this is effected by controlling the rate of fluid flow from and to cavities 66, 67, 68, 69 in the damping block 46 in which the paddles cooperate with the fluid to provide damping.

The orifice plate 56 contains shaped orifices 58a, 58b, 58c and 58d which permit passage of fluid between adjacent cavities. The amount of fluid, if any, passed from one cavity to an adjacent cavity depends upon the rotational position of the orifice plate 56 with respect to damping block 46. The manner in which fluid flow between adjacent cavities is regulated is illustrated by FIG. 5. In the sketches of FIG. 5 only the top of the orifices, cavities, paddles, passageways etc., is illustrated. The low half is similar.

As temperature within the gyro varies, the fluid volume varies because of its high coefficient of expansion and the bellows 74 will collapse or expand proportionally to the change in volume. The longitudinal motion of the bellows is transformed to rotary motion to drive the orifice plate in a manner previously described.

When the temperature within the gyro is at the lower limit of the range over which the gyro is designed to operate, the fluid is more viscous and presents a greater resistance to the motion of the paddles 42, 44. This situation is illustrated in FIG. 5A. Under this condition the bellows will be in such a position that the orifices 58 of the orifice plate 56 assume a position with respect to the damping block 46, as shown.

The orifice 58a provides a maximum amount of orifice area leading from cavity 68 thru passageways 82 such that when paddle 42 moves in the direction shown, minimum restriction of fluid will occur from orifice 58a to orifice 58d. A corresponding situation occurs in the lower half of the orifice plate but for simplicity this is not illustrated in the sketch. If under similar cold temperature situation, the paddle 42 moved counter-clockwise then the fluid flow would be reversed, that is, flow from orifice 58d to orifice 58a. In this temperature situation the greater resistance to motion of the paddles 42, 44 by the fluid is derived by high viscous shear forces within the fluid which tends to overdamp the gimbal. These inherent high viscous shear forces impede the fluid flow through the orifices and other leakage paths that are encountered in passing from cavity 68 to cavity 66. However in this instance the gimbal is not overdamped because the orifice is fully open and its area is proportioned to compensate for the increased viscosity and hence provide a constant damping ratio. As the fluid temperature increases, the orifice plate 56 rotates clockwise and its orifice, 58a, eclipses the fluid passageway 82 which reduces the orifice area and further restricts fluid flow. This variable orifice is shaped such that its area at any temperature offers proportional damping compensation to maintain a constant damping ratio over the operating temperature range.

In FIG. 5B the opposite situation is illustrated whereby the gyro operates at the high end of the temperature range for which it is designed. Under this situation, there is no orifice communication between the cavity 68 and orifice 58a. Hence, if the paddle 42 is caused to move in a clockwise direction, no fluid passes from the passageway 82 since orifice 58 does not contact this passageway and a greater resistance to the paddle motion is imposed by the entrapped fluid, thus providing a relatively larger amount of paddle damping to compensate for the greatly reduced viscous shear damping inherent in the fluid at high temperature.

In summary, the orifices 58 fully restrict fluid passage at the high end of the temperature range over which the gyro is to operate. As the temperature decreases, the orifice plate rotates such that the orifices 58 will encompasss a greater portion of the passageways and thus enlarge the orifice flow path. This action reduces the damping of the paddle system commensurate with the increase of fluid viscosity, thereby maintaining the damping essentially constant. FIG. 6 illustrates this graphically. Curve 84 represents the damping ratio of a gyroscope over a temperature range where there is no compensating damping system. In the curve the damping ratio decreases from 8.0 to 0.3 over a temperature rise of from −30° to 120° C. When damping compensation is provided in accordance with the teachings of this invention, over the same temperature rise, the damping ratio will decrease only from 0.6 to 0.4 as illustrated by curve 85.

It is to be noted that in addition to the superb damping compensation provided by the inventive system, that the conversion of the linear motion of the bellows to rotary motion of the orifice plate results in a gyro of decreased length also.

While I have described above the principles of my invention in connection with the specific apparatus. it is to be clearly understood that the specification is presented by way of example only and not as a limitation of the scope of my invention.

I claim:
1. In a fluid damped gyro system having a gyro unit sealed within a gimbal, mounted within a housing containing damping fluid and having means for maintaining substantially constant damping in said system for variations of temperature, said means comprising:
 (a) paddle means coupled to said gimbal for co-operating with said damping fluid to damp gimbal motion;
 (b) means coupled to said paddle means for forming a plurality of cavities and leakage paths;
 (c) means rotatably coupled to said cavity forming means for varying the leakage paths between cavities; and
 (d) means responsive to volume change of said damping fluid for automatically rotating said means for varying the leakage paths and thereby to maintain constant damping.

2. In a fluid damped gyro system having a gyro unit sealed within a gimbal, and mounted iwthin a housing containing damping fluid and having means for maintaining substantially constant damping in said system for variations in temperature, said means comprising:
 (a) a paddle ring secured to said gimbal, said paddle ring having a plurality of paddles;
 (b) a damping block having cut out portions coupled to said paddle ring so that said paddles separate said cut out portions into cavities, said damping block also having passageways therein;
 (c) an orifice plate having a plurality of orifices therein, said orifice plate rotatably coupled to said damping block, said orifices being positioned with respect to said damping block passageways to define varying leakage paths; and
 (d) volumetric responsive means coupled to said orifice plate for automatically producing rotational movement thereof.

3. The combination claimed in claim 2 in which said volumetric responsive means includes a bellows the free end thereof which longitudinally travels in proportion to temperature change within the gyro caused by the expansion and contraction of the damping fluid.

4. The combination claimed in claim 3 in which said volumetric responsive means further includes a plurality of drive links one end of which are coupled to the free end of said bellows.

5. The combination claimed in claim 4 in which the other ends of said drive links is coupled to said orifice plate.

6. The combination claimed in claim 5 in which the drive links are coupled to the free end of said bellows about the perimeter of a circle of relatively large radius and coupled to said orifice plate about the perimeter of a circle of much smaller radius, such that a minimum longitudinal movement of said bellows is amplified to a much greater rotational movement of said orifice plate.

7. The combination claimed in claim 5 in which said orifice plate has a plurality of pins arranged for rotation therein, said pins each having a hole therein.

8. The combination claimed in claim 7 in which said drive links are coupled to said orifice plate by having said other ends thereof being rotatably engaged in the holes in said pins.

9. The combination claimed in claim 8 in which said other ends of said drive links are L-shaped.

10. In a fluid damped gyro system having a gyro unit sealed within a gimbal, mounted within a housing containing damping fluid and having means for maintaining substantially constant damping in said system for variations of temperature, said means comprising:
 (a) means for providing longitudinal motion of a member in proportion to temperature change of said damping fluid;
 (b) means for controlling said damping fluid; and
 (c) means for converting said longitudinal motion to rotation of said control means such that said rotation is greater than said longitudinal motion.

References Cited

UNITED STATES PATENTS

| | | | |
|---|---|---|---|
| 2,834,213 | 5/1958 | Fredericks | 74—5.5 |
| 2,864,256 | 12/1958 | Haagens et al. | 74—5.5 |
| 2,945,380 | 7/1960 | Pope et al. | 75—5.5 |
| 2,955,472 | 10/1960 | Krupick et al. | 74—5.5 |
| 3,113,594 | 12/1963 | Trempler | 74—5.5 X.R. |
| 3,132,524 | 5/1964 | Krupick et al. | 74—5.5 |
| 3,236,108 | 2/1966 | Zatsky et al. | 74—5.5 |
| 3,336,812 | 8/1967 | Winfrey et al. | 74—5.5 |
| 3,353,415 | 11/1967 | Tiplitz et al. | 74—5.5 |

FRED C. MATTERN, Jr., Primary Examiner

M. A. ANTONAKAS, Assistant Examiner